(12) United States Patent
Hsieh et al.

(10) Patent No.: US 8,493,368 B2
(45) Date of Patent: Jul. 23, 2013

(54) STYLUS FIXING ASSEMBLY AND ELECTRONIC DEVICE USING THE SAME

(75) Inventors: Kun-Chih Hsieh, Taipei Hsien (TW); Wen-Hsing Lin, Taipei Hsien (TW); Ming Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 679 days.

(21) Appl. No.: 12/764,984

(22) Filed: Apr. 22, 2010

(65) Prior Publication Data

US 2011/0157100 A1  Jun. 30, 2011

(30) Foreign Application Priority Data

Dec. 31, 2009  (CN) .......................... 2009 1 0312837

(51) Int. Cl.
*G06F 3/033* (2006.01)
(52) U.S. Cl.
USPC ........................................ 345/179; 178/19.01
(58) Field of Classification Search
USPC ....... 345/179; 178/19.01; 312/223.01–223.02
See application file for complete search history.

(56) References Cited

U.S. PATENT DOCUMENTS

| | | | | |
|---|---|---|---|---|
| 4,666,043 A * | 5/1987 | Tahara | ........................ | 206/581 |
| 4,798,310 A * | 1/1989 | Kasai et al. | ..................... | 221/87 |
| 5,067,573 A * | 11/1991 | Uchida | ........................ | 345/173 |
| 5,180,891 A * | 1/1993 | Trumbo | ..................... | 178/19.01 |
| 5,301,808 A * | 4/1994 | Pierson | ........................ | 206/581 |
| 5,422,442 A * | 6/1995 | Gouda et al. | ............... | 178/19.01 |
| 5,889,512 A * | 3/1999 | Moller et al. | ................. | 345/179 |
| 7,374,359 B1 * | 5/2008 | Annerino et al. | ............. | 401/258 |
| 7,518,598 B2 * | 4/2009 | Liu | ............................... | 345/179 |

* cited by examiner

*Primary Examiner* — Dorothy Harris
(74) *Attorney, Agent, or Firm* — Altis Law Group, Inc.

(57) ABSTRACT

An electronic device includes a main body, a stylus and a stylus fixing assembly fixed on the main body for seating the stylus. The stylus fixing assembly includes a cover, a fixing element fixed on the cover, a guide element, a rotation element, a clasping element rotatably fixed on the cover, a first spring and a second spring. The fixing element includes three guide grooves and a convex stage disposed on the inner wall therein. The guide element includes several first teeth and three first guide ribs. The rotation element includes a cylindrical portion, a resisting portion, several second teeth and three second guide ribs. Two ends of the first spring are fixed on the sidewall of the cover and the resisting portion separately. Two ends of the second spring are connected with the cover and the clasping element.

22 Claims, 6 Drawing Sheets

STYLUS FIXING ASSEMBLY AND ELECTRONIC DEVICE USING THE SAME

BACKGROUND

1. Technical Field

The present disclosure relates to a stylus fixing assembly and an electronic device using the same.

2. Description of Related Art

For electronic devices with touch screens such as cell phones, computers, e-books etc., styluses are frequently used input devices. These electronic devices often include a stylus fixing assembly for securing the stylus when not in use. One such stylus fixing assembly defines a receiving cavity and includes one or more elastic members accommodated in the receiving cavity. The receiving cavity is allocated at the sidewall of the electronic device for accommodating the stylus. The one or more elastic members such as elastic tabs or hooks are disposed on the sidewalls of the receiving cavity. The stylus defines a circular groove close to the nib thereof. When the stylus is seated in the receiving cavity, the elastic tabs or hooks are received in the circular groove of the stylus. The stylus is accordingly firmly held in the receiving cavity.

However, restoring forces of the elastic tabs or hooks may weaken with repeated use and may no longer, with time, firmly fix the stylus, which may escape the receiving cavity during transport. Furthermore, the elastic tabs or hooks can abrade the circumference of the stylus, affecting the appearance thereof.

Therefore, what is called for is an electronic device with an improved stylus fixing assembly alleviating the limitations described.

DETAILED DESCRIPTION

Figure 1:
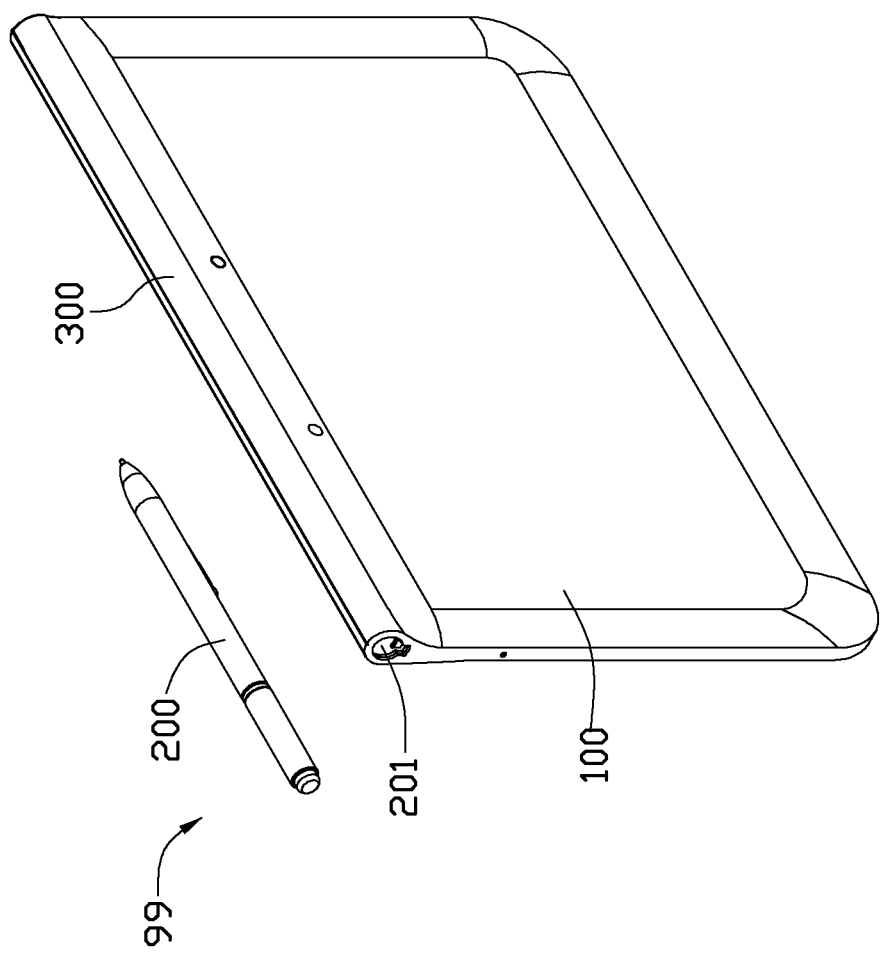
FIG. 1 is an isometric view of an exemplary embodiment of an electronic device with a stylus fixing assembly.

Referring to FIG. 1, an electronic device 99 is disclosed as an exemplary embodiment. The electronic device 99 includes a main body 100, a stylus 200 and a stylus fixing assembly 300 fixed on one sidewall of the main body 100 for receiving the stylus 200.

Figure 2:
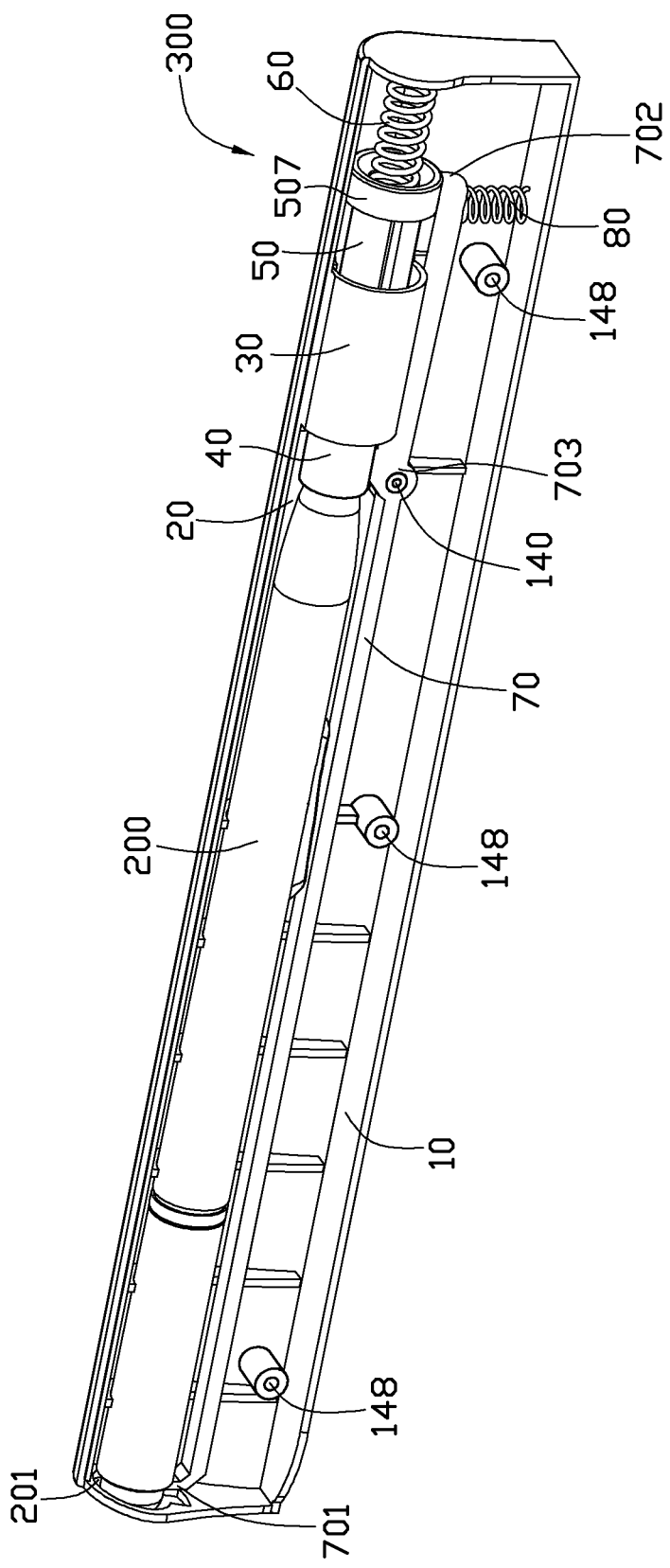
FIG. 2 is a partial, isometric view of the stylus fixing assembly of FIG. 1 with an upper cover removed.
Figure 3:
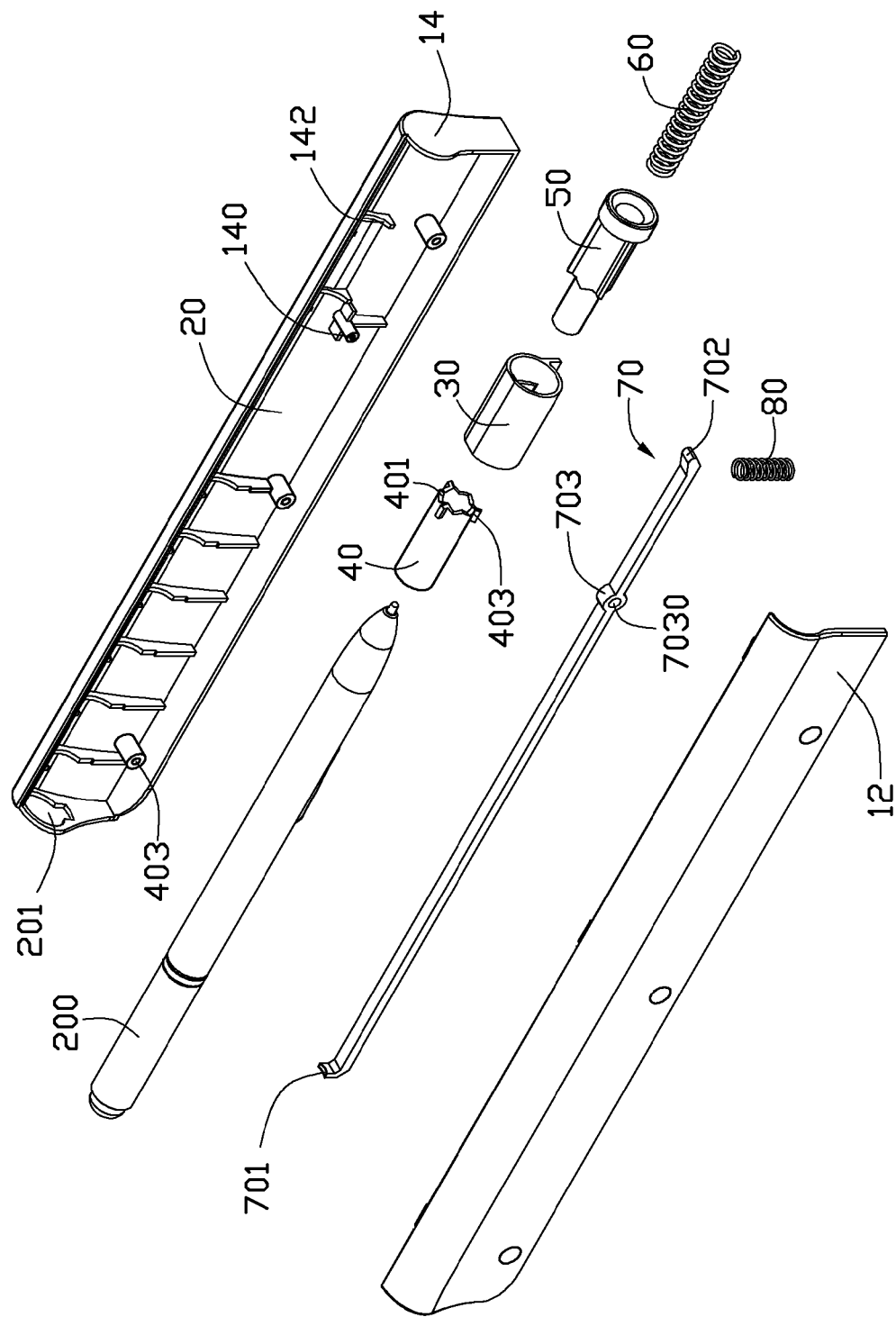
FIG. 3 is an exploded view of the stylus fixing assembly of FIG. 2.

Referring to FIGS. 2 and 3, in the exemplary embodiment, the stylus fixing assembly 300 includes a cover 10, a fixing element 30, a guide element 40 and a rotation element 50. A stylus receiving groove 20 is defined in the cover 10 for receiving the stylus 200.

The cover 10 includes an upper cover 12 and a base cover 14. The upper cover 12 and the base cover 14 are connected to each other by, for example, hooks or screws. The receiving groove 20 is defined between the upper cover 12 and the base cover 14. The base cover 14 defines an opening 201 at one end of the base cover 14, via which the stylus 200 can be received in and removed from the stylus receiving groove 20.

The base cover 14 includes two supporting portions 142 protruding from another end away from the opening 201. The fixing element 30 is positioned between and supported by the two supporting portions 142.

Figure 4:
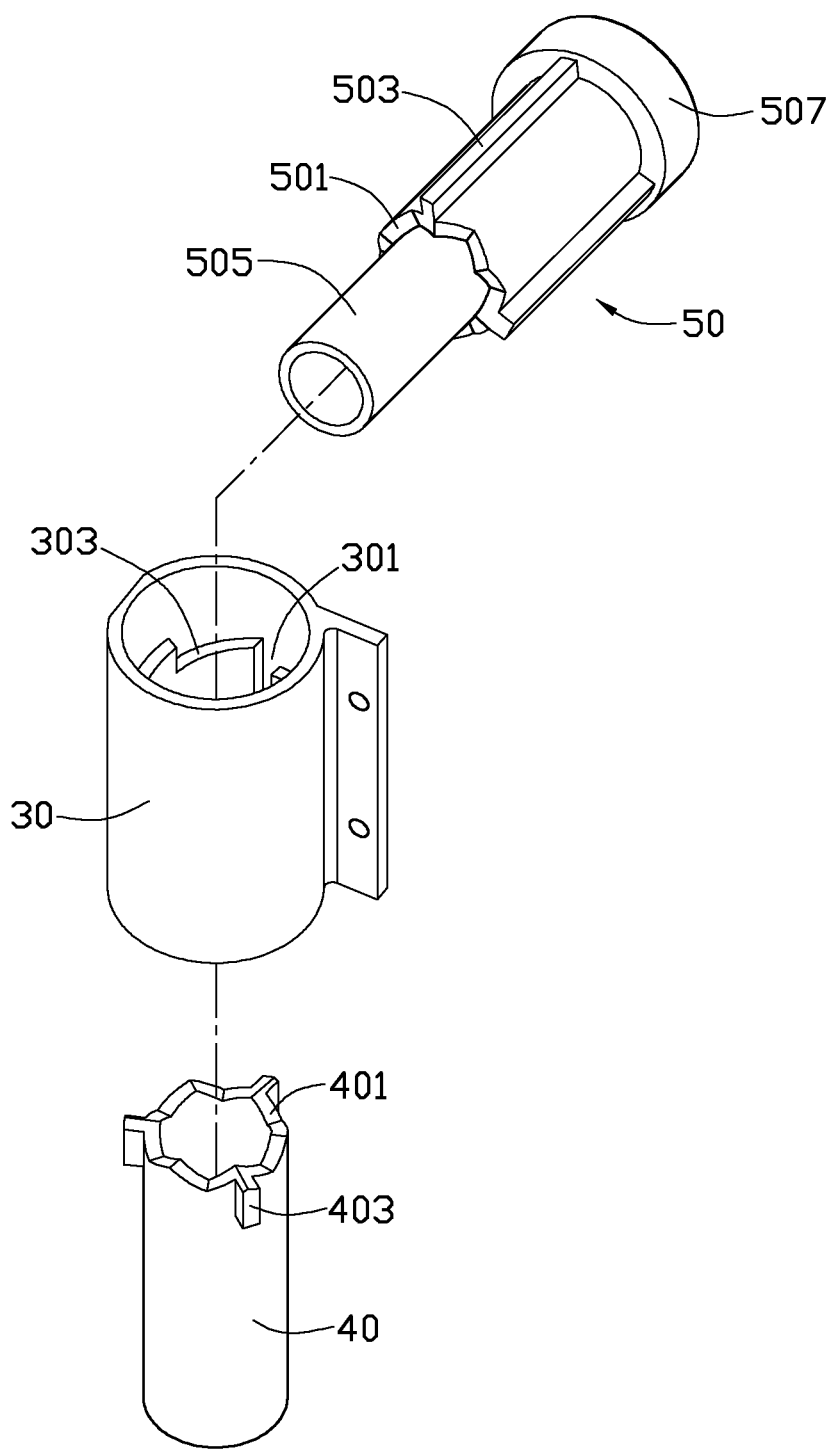
FIG. 4 is an isometric, partial, enlarged view of the stylus fixing assembly of FIG. 3.

Referring to FIG. 4, the fixing element 30 is cylindrical, and defines three equally spaced axial guide grooves 301 on the inner wall thereof, and a zigzag convex stage 303 disposed on one end of the inner wall thereof. The guide element 40 is cylindrical. The guide element 40 defines several first teeth 401 and three first guide ribs 403. The first teeth 401 protrude from an end surface of the guide element 40 and can be received in the convex stage 303 of the fixing element 30. The three first guide ribs 403 correspond to the three guide grooves 301. The three first guide ribs 403 protrude from the circumference of the guide element 40, and are allocated at the end of the guide element 40, from which the first teeth 401 protrude. The external diameter of the guide element 40 is less than the inner diameter of the fixing element 30. The end of the guide element 40 from which the first teeth 401 protrude is sleeved in the fixing element 30, and the other end is adapted for receiving the nib of the stylus 200.

The rotation element 50 is cylindrical and selectively engages the guide element 40 or the convex stage 303. The rotation element 50 includes several second teeth 501, three second guide ribs 503, a cylindrical portion 505 allocated at one end of the rotation element 50, and a resisting portion 507 allocated at the other end of the rotation element 50. The second teeth 501 protrude from the rotation element 50, adjacent to the cylindrical portion 505. The three second guide ribs 503 correspond to the three guide grooves 301. The three second guide ribs 503 protrude from the circumference of the rotation element 50. One end of the second guide ribs 503 is adjacent to the second teeth 501, and the other end of the second guide ribs 503 is connected to the resisting portion 507. The external diameter of the cylindrical portion 505 is less than the inner diameter of the guide element 40. The external diameter of the resisting portion 507 exceeds the inner diameter of the fixing element 30. The second teeth 501 are opposite to and can be received in the first teeth 401 or the convex stage 303 of the fixing element 30.

Referring back to FIG. 2, the stylus fixing assembly 300 further includes a first spring 60, a clasping element 70 and a second spring 80. One end of the first spring 60 is fixed on the sidewall of the base cover 14, and the other end is fixed on the resisting portion 507 of the rotation element 50. Further referring back to FIG. 3, the clasping element 70 is longitudinal and includes a first hook 701 and a second hook 702 allocated at the two ends of the clasping element 70 respectively. The clasping element 70 further includes a cylindrical rotation portion 703 defining a through hole 7030 in its center. The rotation portion 703 is allocated between the first and second hooks 701, 702. The rotation portion 703 is sleeved on the fixing pole 140 via the through hole 7030, such that the clasping element 70 is rotatably connected with the base cover 14. One end of the second spring 80 is fixed on the other sidewall of the base cover 14, and the other end resists the second hook 702.

Referring back to FIG. 2, in the exemplary embodiment, the base cover 14 further defines three equally spaced restriction poles 148 in a line. The clasping element 70 is allocated between the stylus receiving groove 20 and the three restriction poles 148. The clasping element 70 is longer than the farthest distance between two of the three restriction poles 148, thus the restriction poles 148 can restrict the rotation angle of the clasping element 70.

Figure 5:
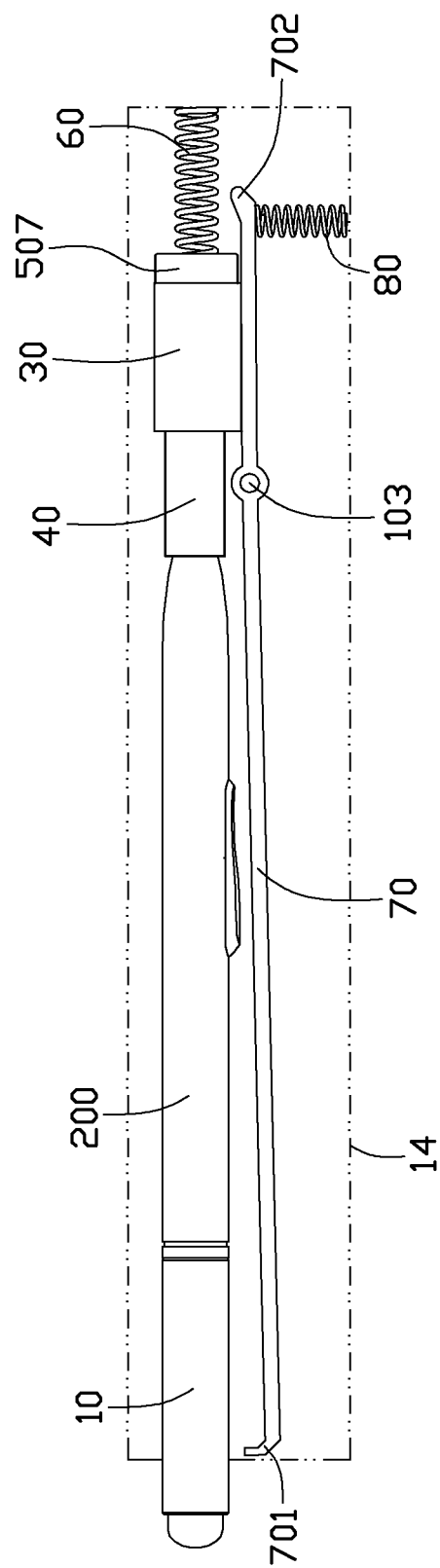
FIG. 5 is an isometric, partial view of the stylus fixing assembly of FIG. 2.
Figure 6:
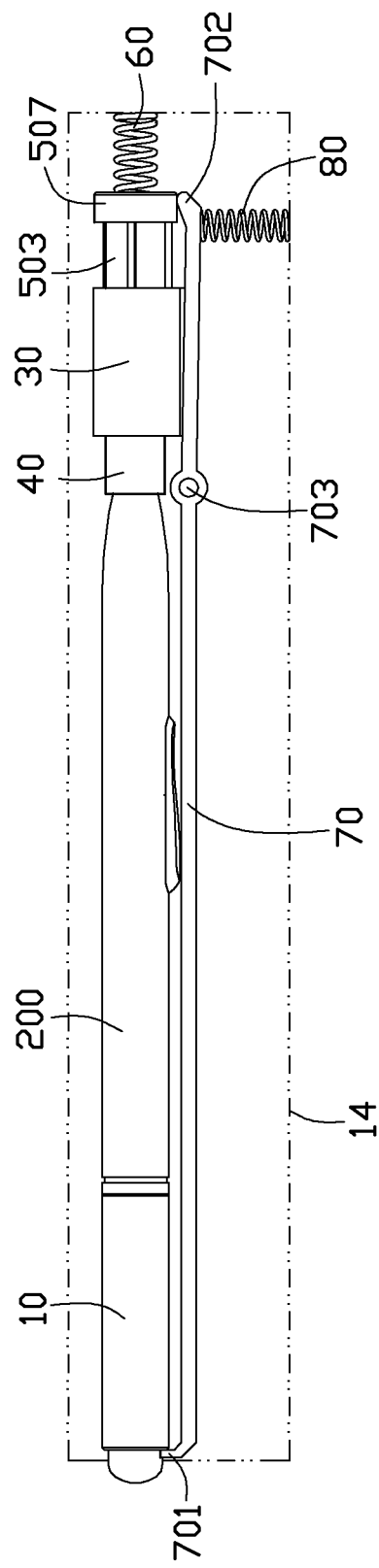
FIG. 6 is an isometric, partial view of the stylus fixing assembly, similar to that of FIG. 5, but in a different operational state.

Referring to FIG. 5, when it is to be received in the stylus receiving groove 20, the stylus 200 enters the opening 201, and the nib end of the stylus 200 enters the guide element 40, and slides the guide element 40 therealong, the first teeth 401 of the guide element 40 resist the second teeth 501 of the rotation element 50. At the same time, the three first guide ribs 403 of the guide element 40 and the three second guide ribs 503 of the rotation element 50 are received in and slide along the three guide grooves 301 of the fixing element 30, thus the rotation element 50 can be slid along the stylus receiving groove 20 by the guide element 40, but cannot be rotated. As the rotation element 50 is moved, the resisting portion 507 presses the second hook 702, rotating the clasping element 70 clockwise. Referring to FIG. 6, finally, the first hook 70 clasps the end of the stylus 200, which is accordingly securely received in the stylus receiving groove 20. The first spring 60 and the second spring 80 are compressed at this time.

For deployment, the stylus 200 is easily ejected from the stylus receiving groove 20 by pressing the stylus 200. Specifically, further referring to FIG. 6, when the stylus 200 is pressed, the guide element 40 is slid along the guide grooves 301. Thus the guide element 40 slides the rotation element 50 along the guide grooves 301 in the same direction until the second teeth 501 depart from the convex stage 303 of the fixing element 30. First spring 60 rotates the rotation element 50 to via elastic reversion force, until the second guide ribs 503 slide into the guide grooves 301. Then the pressure on the stylus 200 can be released, the first spring 60 will push the rotation element 50 to slide back along the guide grooves 301 and the second teeth 501 will resist the first teeth 401. Thus the guide element 40 will also be slid back along the guide grooves 301. The resisting portion 507 detaches from the second hook 702 with the continual slide of the rotation element 50, and second spring 80 resists the second hook 702 via the elastic reversion force, rotating the clasping element 70 counter-clockwise. Thus the stylus 200 is released from the first hook 701, ejected from the stylus receiving groove 20 by the elastic reversion force of the second spring 80, and finally withdrawn from the stylus receiving groove 20.

Although the present disclosure has been specifically described on the basis of the embodiments thereof, the disclosure is not to be construed as limited thereto. Various changes or modifications may be made to the embodiments without departing from the scope and spirit of the disclosure.

What is claimed is:

1. A fixing assembly of an electronic device configured for seating a stylus, the stylus fixing assembly comprising:
    a cover defining a stylus receiving groove;
    a fixing element fixed in the stylus receiving groove, defining a guide groove and comprising a convex stage disposed on an inner wall of the fixing element;
    a guide element sleeved in the fixing element, receiving a nib of the stylus, wherein a first guide rib protrudes around the circumference of the guide element, slidably received in the guide groove;
    a rotation element slidably received in the stylus receiving groove, and selectively engaging the guide element or the convex stage, wherein the rotation element comprises:
        a resisting portion allocated at an end thereof; and
        at least one second guide rib protruding from the circumference of the rotation element, and slidably received in the guide groove;
    a clasping element rotatably fixed on the cover for clasping the stylus, wherein the clasping element is pushed by the stylus to rotate clockwise when the stylus is being inserted into the stylus receiving groove, and pushed by the stylus to rotate counter-clockwise when the stylus is being taken out of the stylus receiving groove;
    a first spring fixed between the sidewall of the cover and the resisting portion;
    a second spring, wherein one end of the second spring is fixed on the cover, and the other end resists the clasping element.

2. The stylus fixing assembly as described in claim 1, wherein the cover further comprises a fixing pole, the fixing pole protrudes from the base of the cover adjacent to the stylus receiving groove; and the clasping element comprising: a first hook, a second hook and a rotation portion; the first and second hooks allocated at the two ends of the clasping element; and the rotation portion allocated between the first and second hooks and sleeved on the fixing pole.

3. The stylus fixing assembly as described in claim 2, wherein the clasping element is longitudinal.

4. The stylus fixing assembly as described in claim 1, wherein an opening is defined at one end of the sidewall of the cover, via which the stylus can be received in and removed from the stylus receiving groove.

5. The stylus fixing assembly as described in claim 4, wherein two supporting portions are disposed away from the opening protruding from the cover, and the fixing element is supported by and between the two supporting portions.

6. The stylus fixing assembly as described in claim 1, wherein three first guide ribs, three second guide ribs, and three guide grooves are deployed.

7. The stylus fixing assembly as described in claim 1, wherein the guide element further comprises several first teeth protruding from the guide element; the rotation portion is cylindrical and further comprises several second teeth protruding from the rotation element; and the first guide rib is allocated at the right end of the guide element from which the first teeth protrude.

8. The stylus fixing assembly as described in claim 1, wherein the fixing element is cylindrical; the external diameter of the guide element is less than the inner diameter of the fixing element; and the external diameter of the resisting portion exceeds the inner diameter of the fixing element.

9. The stylus fixing assembly as described in claim 2, wherein the rotation portion defines a through hole via which the rotation portion is sleeved on the fixing pole.

10. The stylus fixing assembly as described in claim 1, wherein the cover includes an upper cover and a base cover connected to the upper cover by hooks or screws.

11. An electronic device comprising:
    a main body;
    a stylus; and
    a stylus fixing assembly fixed on the main body for seating the stylus, wherein the stylus fixing assembly comprises:
    a cover defining a stylus receiving groove;
    a fixing element fixed in the stylus receiving groove, defining a guide groove and comprising a convex stage disposed on an inner wall of the fixing element;
    a guide element slidably sleeved in the fixing element, receiving a nib of the stylus, wherein a first guide rib protrudes around the circumference of the guide element, and the first guide rib is slidably received in the guide groove;
    a cylindrical rotation element slidably received in the stylus receiving groove, and selectively engaging the guide element or the convex stage, wherein the rotation element comprises:
        a resisting portion allocated at an end of the rotation element; and at least one second guide rib protruding from the circumference of the rotation element, and slidably received in the guide groove;

a clasping element rotatably fixed on the cover for clasping the stylus, wherein the clasping element is pushed by the stylus to rotate clockwise when the stylus is being inserted into the stylus receiving groove, and pushed by the stylus to rotate counter-clockwise when the stylus is being taken out of the stylus receiving groove;

a first spring fixed between the sidewall of the cover and the resisting portion;

a second spring, one end of which is fixed on the cover and the other end resists the clasping element.

12. The electronic device as described in claim 11, wherein the cover further comprises a fixing pole protruding from the base of the cover adjacent to the stylus receiving groove; and the clasping element comprising: a first hook, a second hook and a rotation portion; the first and second hooks allocated at the two ends of the clasping element; and the rotation portion allocated between the first and second hooks and sleeved on the fixing pole.

13. The electronic device as described in claim 12, wherein the clasping element is longitudinal.

14. The electronic device as described in claim 11, wherein an opening is defined at one end of the sidewall of the cover, via which the stylus can be received in and removed from the stylus receiving groove.

15. The electronic device as described in claim 14, wherein two supporting portions are disposed away from the opening protruding from the cover, and the fixing element is supported by and between the two supporting portions.

16. The electronic device as described in claim 11, wherein three first guide ribs, three second guide ribs and three guide grooves are deployed.

17. The electronic device as described in claim 11, wherein the guide element further comprises several first teeth protruding from the guide element; the rotation portion is cylindrical and further comprises several second teeth protruding from the rotation element; and the first guide rib is allocated at the right end of the guide element from which the first teeth protrude.

18. The electronic device as described in claim 11, wherein the fixing element is cylindrical; the external diameter of the guide element is less than the inner diameter of the fixing element; and the external diameter of the resisting portion exceeds the inner diameter of the fixing element.

19. The electronic device as described in claim 12, wherein the rotation portion defines a through hole, via which the rotation portion is sleeved on the fixing pole.

20. The electronic device as described in claim 11, wherein the cover includes an upper cover and a base cover connected to the upper cover by hooks or screws.

21. The stylus fixing assembly as described in claim 3, wherein when the stylus is being inserted in the stylus receiving groove, the first hook is configured to clasp the end of the stylus, the second hook is configured to clasp the resisting portion.

22. The electronic device as described in claim 13, wherein when the stylus is being inserted in the stylus receiving groove, the first hook is configured to clasp the end of the stylus, the second hook is configured to clasp the resisting portion.

* * * * *